Jan. 8, 1952     L. W. WHITE     2,581,892
COVER HINGE
Filed June 28, 1947     3 Sheets-Sheet 1
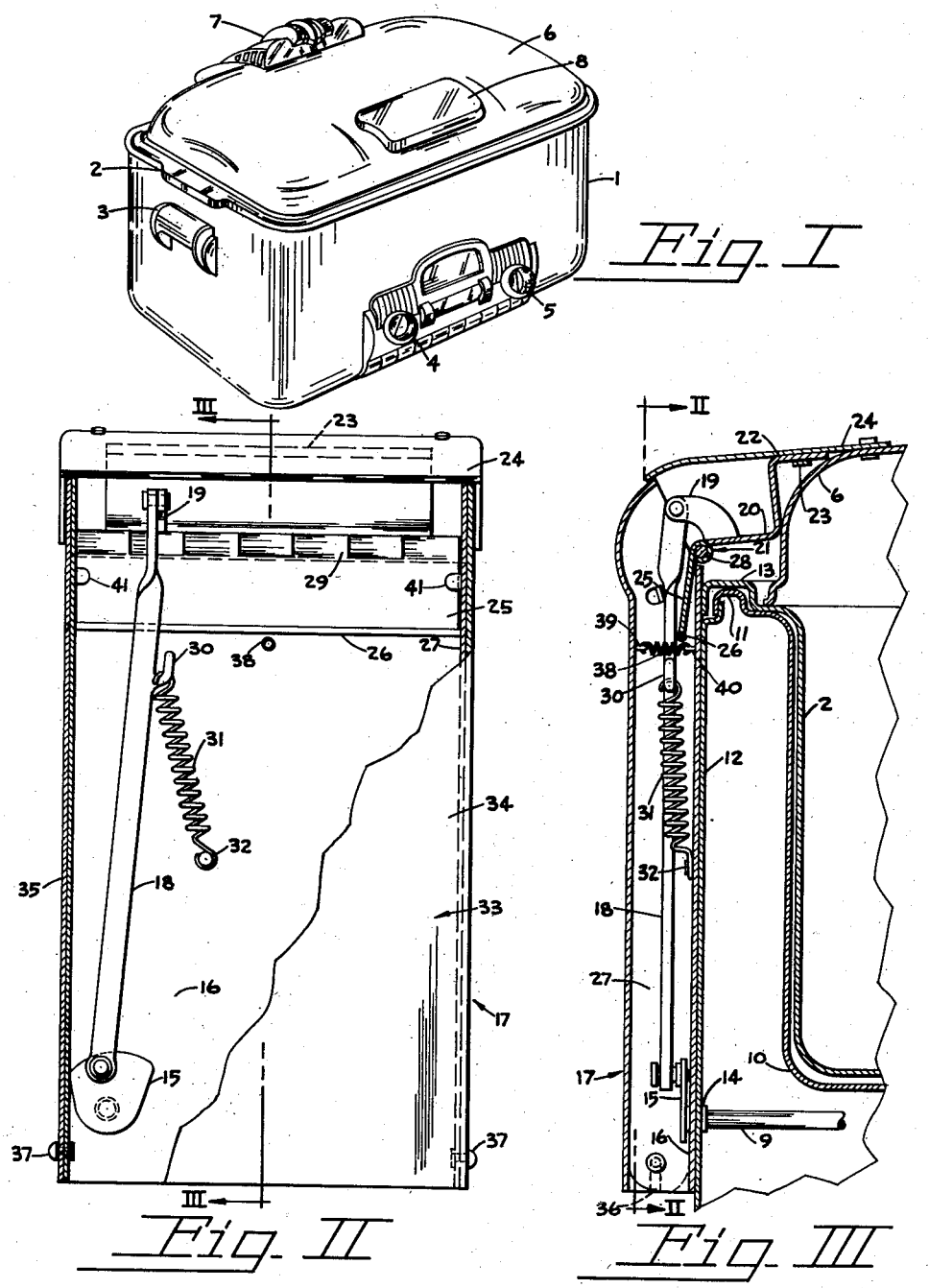
INVENTOR.
LESTER W. WHITE
BY
Marshall and Marshall
ATTORNEYS

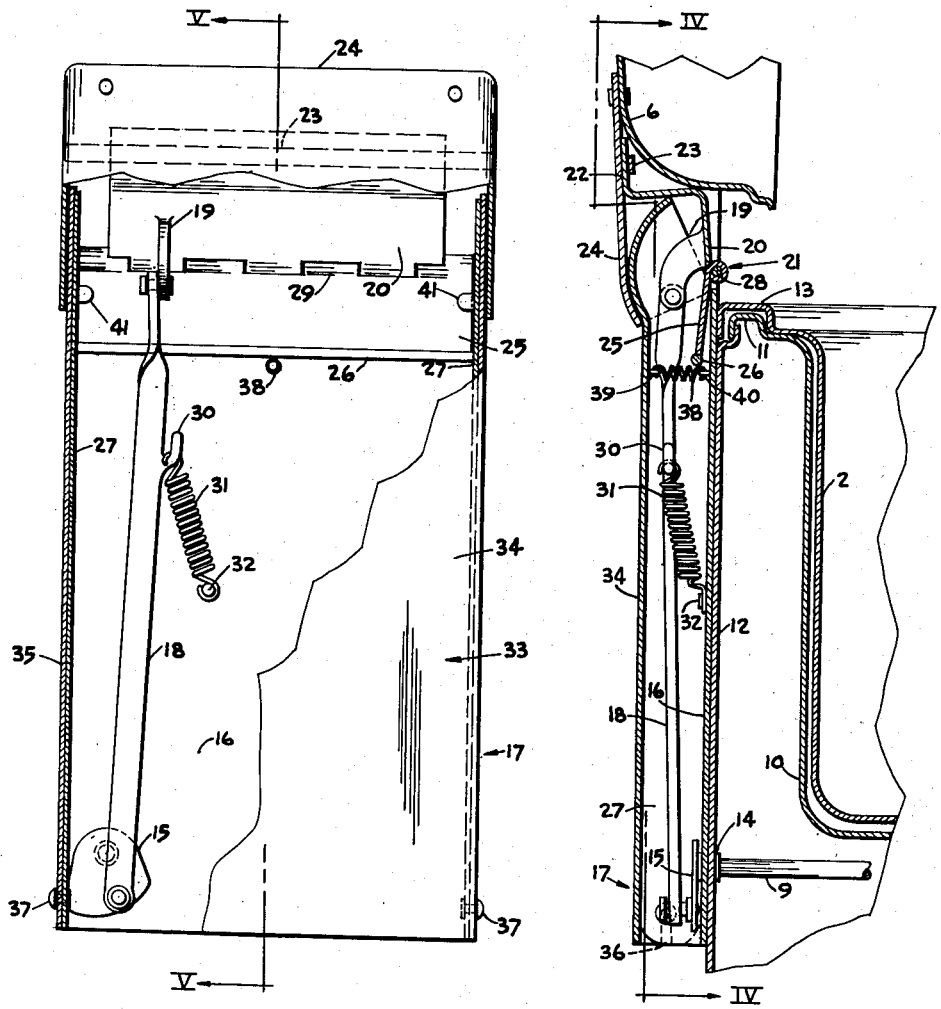

Jan. 8, 1952 — L. W. WHITE — 2,581,892
COVER HINGE
Filed June 28, 1947 — 3 Sheets-Sheet 3
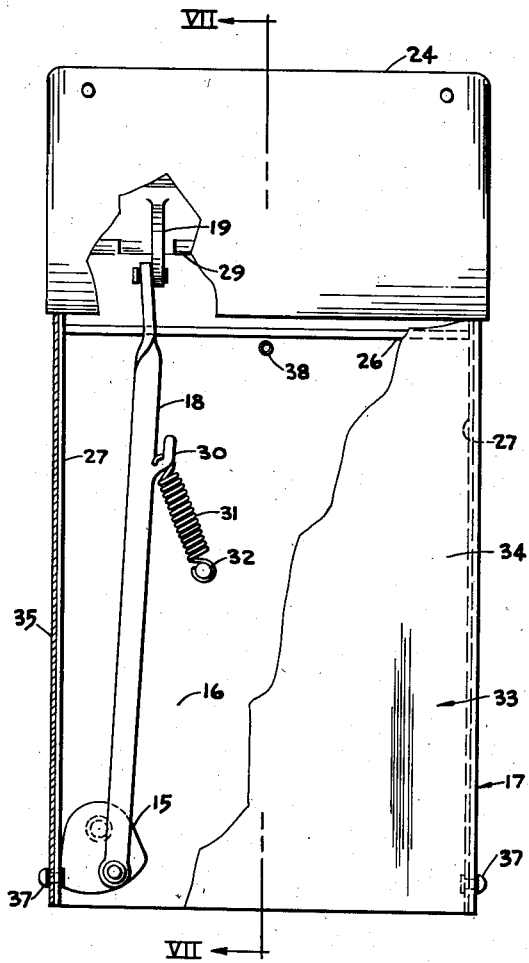
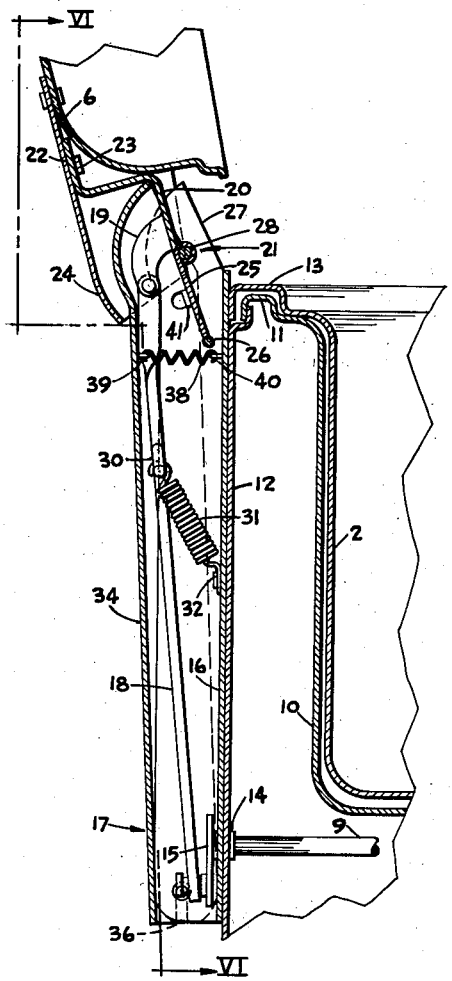
Fig. VI
Fig. VII
INVENTOR.
LESTER W. WHITE
BY
Marshall and Marshall
ATTORNEYS Patented Jan. 8, 1952

2,581,892

UNITED STATES PATENT OFFICE 2,581,892

COVER HINGE

Lester W. White, Toledo, Ohio, assignor, by mesne assignments, to Tropic-Aire, Inc., Chicago, Ill., a corporation Application June 28, 1947, Serial No. 757,697

4 Claims. (Cl. 220—17)

1

This application relates to electric roasters and, more particularly to a hinge for mounting the cover of a domestic type electric roaster.

An electric food roaster of the type used domestically consists in essence of a large pan set into a housing which contains electrical resistance wires for heating the set-in pan so that food placed in the pan is cooked. In order to prevent the escape of steam and food odors into the kitchen and also to permit the proper preparation of the food such a roaster invariably is equipped with a cover which must be openable to permit insertion and removal of food from the roaster and to permit the inspection of the food during cooking.

Because the cover of the roaster is located over the food being cooked and above the heated portion of the roaster, it becomes hot during the cooking process. Furthermore, when the roaster cover is lifted, hot steam escapes around the cover and is likely to scald the hand or arm of the person lifting the cover. To avoid this possibility mechanism may be used such as is disclosed and claimed in Patent No. 2,209,693 issued July 30, 1940, to K. M. Hammell, which permits the opening of the cover by rotating a knob located at the lower front of the roaster. The cover when constructed in accordance with this patent is hinged at the rear of the roaster and when the actuating knob is rotated the cover is swung upwardly.

Because the cover although warm is, of course, cooler than the temperature of the food being prepared or of the cooking pan, moisture driven from the food in the form of vapor, condenses on the interior of the roaster cover. It is desirable, therefore, that when the cover is swung open it should still be located with its lower rear edge above the edge of the roaster pan so that any moisture which has condensed on the cover and which, of course, runs down the cover when it is opened will drip back into the roaster rather than dripping behind the roaster onto the table or counter on which the roaster rests.

This construction is not possible, however, where the ordinary hinge is employed at the rear of the roaster cover because the cover must open sufficiently to permit the withdrawal of the cooking pan from the interior of the roaster so that the pan can be removed, to facilitate access to the food or for the purpose of cleaning.

Roasters having hinged covers, therefore, have been designed in the past so that when the covers are opened they are swung back far enough to permit the removal of the roaster pans and, therefore, moisture condensed on such covers

2 drips not back into the roaster pans (as would be desirable) but outside the roaster pans onto either the exterior of the roasters onto the table or counter on which they rest.

It is an object of this invention to provide a roaster cover hinge which will normally open the roaster cover to a position in which moisture condensed on its inner surface will drip back into the interior of the roaster and which can be opened to a second position in which the roaster cover does not interfere with the removal of the inserted cooking pan.

It is a further object of this invention to provide a hinge for a roaster cover having two open positions and thereby to permit the roaster cover normally to be opened to a position where condensed moisture on the inside of the cover drips back into the cooking pan and, when desired, to be opened to a second position to permit the inserted cooking pan to be removed from the roaster.

More specific objects and advantages will be apparent from the drawings, in which:

Figure I is a view in perspective of an electric food roaster embodying the invention.

Figure II is a fragmentary view in elevation, certain parts being broken away, of a hinge structure embodying the invention and shown in the position assumed when the roaster cover is closed.

Figure III is a fragmentary vertical sectional view taken substantially on the line III—III of Figure II.

Figure IV is a view similar to Figure II but showing the hinge mechanism in the position assumed when the roaster cover is opened to its first position.

Figure V is a fragmentary vertical sectional view taken substantially on the line V—V of Figure IV.

Figure VI is a fragmentary vertical sectional view similar to Figure V but showing the hinge in the position with the cover open to its second position.

Figure VII is a fragmentary vertical sectional view taken substantially on the line VI—VI of Figure VI.

The roaster illustrated in Figure I consists of an outer housing 1 into which is removably insertable an insert or cooking pan 2. The roaster is equipped with handles 3, a temperature control 4, a cover lifter knob 5 and a cover 6. The cover 6 may be equipped with a vent mechanism 7 and an observation glass 8.

The cover lifter knob 5 is secured on the forward end of a rearwardly extending horizontal shaft 9 (Figure III) which extends beneath an inner liner 10 of the roaster and the insert 2 which fits inside of the inner liner 10. The inner liner 10 has a lip 11 which overlies the upper edge of an outer case 12 of the housing 1 and the insert 2 has a lip 13 which overlies the lip 11 of the liner 10.

The rear end of the shaft 9 is rotatably mounted by bushings 14 in the outer case 12 of the housing. A bell crank 15 is fixed on the rearmost end of the shaft 9 which extends outside of the outer case 12 and through a front wall 16 of a hinge mechanism housing member 17.

A vertically extending link 18 is pivotally connected at its lowermost end to the bell crank 15 and at its upper end is twisted and pivotally attached to a finger 19 extending up from a formed wing 20 which is one portion of a cover hinge 21. The wing 20 has a flange 22 which is insertable beneath a cross bar 23 welded in turn to the underside of a cover bracket 24 from which it is spaced sufficiently to permit the insertion of the flange 22 beneath the cross bar 23. The cover bracket 24 is riveted or otherwise secured near the rear center of the cover 6.

The other member of the hinge 21 is a straight wing 25 the lower edge of which is welded or otherwise secured to a horizontally extending pin 26. The ends of the pin 26 are inserted in a pair of holes punched in rearwardly extending side walls 27 of the hinge mechanism housing member 17. The two wings 20 and 25 of the hinge 21 are connected to each other by a hinge pin 28 which extends through alternately formed ears 29 on the two hinge wings.

Near the upper end of the link 18 there is formed a hook 30 in which is engaged the upper end of a coil spring 31, the lower end of which is secured to a rivet 32 fixed on the forward wall 16 of the hinge mechanism housing 17.

A hinge housing cover 33 having a rear wall 34 and two side walls 35 fits over the housing member 17 to enclose the hinge mechanism. The lower ends of the side walls 35 of the cover 33 are provided with slots 36 fit over the shanks of rivets 37 which are positioned in the side walls 27 of the housing member 17 to serve as pivots to permit the cover 33 to swing back to the position shown in Figure VII. The cover 33 is held in the position shown in Figures III and V by a spring 38 engaged between an ear 39 welded on the interior of the rear wall 34 of the cover 33 and an ear 40 stamped out of the front wall 16 of the housing member 17. The upper end of the cover 33 is convexly curved and its upper edge extends beneath the similarly curved rearward edge of the cover bracket 24. The curvature of both the rear end of the cover bracket 24 and the upper end of the hinge mechanism cover 33 is determined by using the normal position of the hinge pin 28 as a center.

Swinging motion of the wing 25 rearwardly on its pivot pin 26 is limited by a pair of ears 41 stamped out of the upper side walls 27.

As can be seen in Figures II and III when the cover is closed the bell crank 15 is turned over center (to the left in Figure II) of the shaft 9 and rests against the end wall 27 of the hinge housing. By rotating the knob (in a counterclockwise direction in Figure I) the bell crank 15 is rotated (in a clockwise direction in Figure II) extending the spring 31 slightly to permit it to pass over center. The spring 31 then tends to contract exerting downward force on the link 18 and continuing the rotation of the shaft 9. The link 18 pulls on the finger 19 and as the spring further compresses raises the cover 6 to the position shown in Figures IV and V.

It will be noted that in Figures IV and V the wings 20 and 25 of the hinge 21 are swung open until the two wings 20 and 25 engage each other. With the hinge in this position it will be observed that the rear lower edge of the cover 6 is located vertically above the inside edge of the lip 13 on the insert 2 so that such condensation as may have formed on the interior of the cover 6 drips back into the roaster insert 2.

The hinge wing 25 still remains tilted slightly forward with the hinge pin 28 in front of the second hinge pin 26 (to the right in Figures III and V). This wing is held in this position by tension of the spring 31 acting through the link 18 and finger 19 and the angle at which it is held is controlled by the engagement of the inner side of the wing 25 with the uppermost end of the front wall 16 of the hinge mechanism housing.

When it is desired to open the cover 6 sufficiently to permit removal of the insert pan 2 (as shown in Figure VI), it is necessary only to exert a slight pressure backwardly against the cover 6 itself. Since the two wings 20 and 25 of the hinge 21 can not move relative to each other beyond the position shown in Figure V, the entire hinge 21 pivots backwardly on the pin 26 until the wing 25 engages the ears 41, carrying the cover 6 rearwardly far enough so that no part of the cover 6 overlies any portion of the insert pan 2.

The strength of the spring 31 and the relative vertical locations of the lower end of the spring 31, the second hinge pin 26 and the first hinge pin 28 is such that movement of the cover from the position shown in Figure V to the position shown in Figure VI amounts to moving "over center" which requires a slight extension of the spring 31 (from the position shown in Figure V) and a subsequent further contraction of the spring 31 to the position shown in Figure VI. Movement beyond the position shown in Figure VI is prevented by the engagement of the lower left-hand side (Figure IV) of the bell crank 15 with the side wall 27 of the hinge enclosure.

Because of this "over center" relationship of the two hinge pins, the cover 6 does not move to the position shown in Figure VI when the lifter knob 5 is rotated to open the cover during cooking. The strength of the spring 31 is only sufficient to swing the cover to the position shown in Figure VI unless the knob 5 is rotated with considerable force so that, as the cover opens, considerable speed is built up and the cover reaches the position shown in Figure V with sufficient momentum to carry it up and over to the position shown in Figure VI.

When it is desired to remove the cover 6 completely, to facilitate washing its interior, it can be disengaged by lifting it vertically from either the position shown in Figure V or the position shown in Figure VI. This disengages the cross bar 23 from the flange 22 of the hinge wing 20. When it is desired to replace the cover the flange 22 again is inserted back of the crossbar 23 and the cover lifter knob rotated in a clockwise direction (Figure I) to exert force upwardly on the link 18 and swing the cover 6 back to its closed position. The cover 6 can be closed from either the position shown in Figure V or the position shown in Figure VI by means of the cover lifter knob 5 because the rotation of the knob in the return direction first pushes upwardly on the link 18 allowing the hinge portion 25 to swing back to its standard position adjacent the upper edge of the front wall 16 of the hinge mechanism housing and then, against the force of the spring, lowers the cover 6 into its closed position. The strength of the spring 31 is selected to nicely balance the force exerted by gravity acting on the cover 6 so that the operator has only to overcome the slight friction in order to swing the cover and so that the cover will not inadvertently fall shut.

The embodiment of the invention which has been described may be modified to meet various requirements.

Having described the invention, I claim:

1. In a food roaster having a body and an open topped vertically removable food receptacle insertable therein, in combination, a cover for said receptacle; a horizontal hinge for mounting said cover on said body, said hinge having two wings and a horizontal hinge pin connecting said wings and being removably secured to said cover by one wing and pivotally connected to said body by the other wing, said hinge being pivotable only on its hinge pin to move said cover from closed position to a first open position with the lower edge of said cover vertically overlying the edge of said receptacle whereby condensation on said cover drips into said receptacle and being pivotable only on its connection to said body to move said cover from the first open position to a second open position with the entire cover lying vertically outside the edge of said receptacle whereby said receptacle may be removed vertically from said body when said cover is in the second open position; and manually operable means connected to said hinge for pivoting the same.

2. In a food roaster having a body and a vertically removable open topped food receptacle therein, in combination, a cover for said receptacle, a hinge having two wings and a hinge pin for mounting said cover on said body, and manually operable cover lifter means mounted on said body and operatively linked to said cover through said hinge, one wing of said hinge being secured to said cover, the other wing of said hinge being pivotally connected to said body, said hinge being pivotable on its hinge pin only to a first of two open positions in which the lower edge of said cover overlies the opened top of said receptacle and on its pivotal connection to said body only to a second open position in which no part of said cover overlies any part of said receptacle.

3. In a food roaster having a body and a removable open topped food receptacle therein, in combination, a cover for said receptacle hinged to said body, the hinge having two wings and a horizontally disposed hinge pin connecting said wings, one of said wings being removably attached to said cover and the other of said wings being pivotally connected to said body, and auxiliary operating means connected to that one of said wings removably attached to said cover for swinging said cover to and from closed position with said hinge swinging only on said hinge pin, to a first open position with said cover extending substantially vertically above the edge of said receptacle and with the lower edge of said cover overlying the edge of said receptacle, said hinge also being further pivotable only on its connection to said body to a second open position rearward of said first position with no part of said cover overlying the edge of said receptacle.

4. In a food roaster having an open topped body and an open topper vertically removable food receptacle therein, the combination consisting in a cover for said receptacle mounted on said body and hinge means for mounting said cover, said hinge means comprising a hinge leaf removably mounting said cover; a hinge pin for pivotally mounting said leaf, said pin being positioned adjacent the rear edge of said receptacle, said hinge leaf being movable upwardly and rearwardly on said pin moving said cover to a first position where the lower edge of said cover vertically overlies the rear edge of said receptacle; a second hinge leaf mounting said hinge pin and being pivotally mounted on said body on a line parallel to and below said hinge pin, said second leaf being pivotable rearwardly on its pivotal mounting on said body whereby such rearward movement moves said pin and cover rearwardly bodily to a second position where no part of said cover overlies any part of said receptacle.

LESTER W. WHITE.

REFERENCES CITED

The following references are of record in the file of this patent:

UNITED STATES PATENTS

| Number | Name | Date |
|---|---|---|
| 1,101,521 | Bram | June 30, 1914 |
| 1,126,640 | Jones | Jan. 26, 1915 |
| 1,411,464 | Westerbeck | Apr. 4, 1922 |
| 1,470,910 | Banes | Oct. 16, 1923 |
| 2,209,693 | Hammell | July 30, 1940 |
| 2,216,279 | Packer | Oct. 1, 1940 |
| 2,328,833 | Moon et al. | Sept. 7, 1943 |
| 2,433,305 | Talcott, Jr. | Dec. 23, 1947 |